2,780,512
Patented Feb. 5, 1957

2,780,512
PROCESSES FOR PRODUCING HOLLOW FILAMENTS OF REGENERATED CELLULOSE

Kagenobu Inoshita, Iwakuni, Japan

No Drawing. Application April 16, 1954,
Serial No. 423,854

Claims priority, application Japan April 22, 1953

4 Claims. (Cl. 18—54)

This invention relates to processes for producing hollow filaments of regenerated cellulose.

It has been proposed, heretofore, to produce hollow filaments by methods involving the incorporation in viscose of volatile organic solvents such as petroleum ether, acetone, etc, or soluble carbonates, most commonly sodium carbonate, and extrusion of the mixture into an acid spinning bath. In the acid spinning bath, the organic solvents are gasified by heat and the carbonates react with acid in the bath developing gas so that hollow regenerated cellulose filaments are obtained.

However, these methods are associated with numerous drawbacks and disadvantages. In case of the former, the debubbling operation is very difficult as the solvents are volatile and in addition there is necessity of providing additional apparatus for removing and/or recovering the gas. In case of the latter, solubility of the alkali carbonates exerts undesirable or harmful influence upon ageing and filtering of the viscose and in addition the amount of the carbonates to be added should be comparatively large, commonly 2% or more based on viscose.

I have invented novel processes for producing hollow regenerated cellulose fiber, according to which the substance to be added in the viscose does not harmfully affect the nature of the viscose, the effect of gas generation is excellent, the amount of the substance to be added in the viscose may be small, no particular operation or apparatus is required, the operation is simple and easy, and hollow filaments can be obtained steadily and without fail.

The method of the present invention is characterized by the fact that fine particles of carbonates of alkaline earth metals such as calcium carbonate, barium carbonate and strontium carbonate are suspended in the viscose which has been prepared or is in course of preparation by any known method, and the mixture is extruded into a spinning bath. According to the present invention, the addition of the alkaline earth metal carbonates neither affects the chemical and physical nature of the viscose as these carbonates are insoluble in the viscose, nor exerts any undesirable influence upon filtering of the viscose as they are suspended in the viscose in the form of particles, like titanium oxide to be used as a frosting agent. Furthermore the effect of gas generation is excellent because of the fact that the carbonate particles act as the nucleus of the gas development, the amount of the carbonates to be used may be small, namely about 0.1–3.0%, preferably 0.2–0.5%, based on the viscose, and consequently the amount of sulfuric acid required to neutralize the same may be small. Hollow fiber is thus obtained steadily and economically.

Wide range of spinning baths may be used for this purpose. But spinning baths containing 90–180 g./l. of sulfuric acid, 200–350 g./l. of sodium sulfate and 5–80 g./l. of zinc sulfate and having a temperature between 40° to 70° C. are satisfactory. The viscose to be used may be any known one which generally should analyze from about 33 to 45% carbon disulfide (based on cellulose) as added, from about 5 to 9% sodium hydroxide (based on viscose) and from about 6 to 9% cellulose. The viscose may contain special other substances, such as dyes, pigments, etc. The viscose may also have a wide range of aging degree but an aging degree not less than 8.0 by Hottenroth number is preferable. Particles of the carbonates of alkaline earth metals from about 0.1 to 3.0%, preferably from 0.2 to 0.5% (based on viscose) may be added and suspended in the viscose prepared or being prepared by any known method.

By suitably selecting the composition of viscose, the amount of the carbonates to be added, the aging degree of viscose, the composition of spinning bath and the condition of spinning, filaments of various shapes or types such as flat, macaroni, bamboo, rosary or chaplet-like shape, etc. are obtained. For instance, as the Hottenroth number of the viscose increases, the shape of the hollow fiber generally changes from bamboo-like to flat through macaroni-like shape. While if the Hottenroth number becomes lower shape of the hollow fibre tends to approach from macaroni-like to rosary or chaplet-like shape through bamboo-like shape.

The alkaline earth metal carbonate in this invention may be used together with a known gas-developing substance such as volatile organic solvents, sodium carbonate, etc. Physical condition of spinning may also be suitably varied. For example, if desired, spinning may be effected with or without a stretch being imparted to the filaments.

Generally, the various factors involved in producing the fibers are correlated, and various compositions and conditions are used within the range stated.

The following examples, which are not by any means limitative, are given by way of illustration.

Example 1

Finely grained calcium carbonate in the amount of 0.2% based on cellulose is added and suspended in a viscose aged to a Hottenroth number of 15 and analyzing 36% carbon sulfide (based on cellulose) as added, 8% cellulose and 5.8% sodium hydroxide. The mixture is extruded into a spinning bath having a temperature of 60° C. and containing 150 g./l. sulfuric acid, 300 g./l. sodium sulfate and 70 g./l. zinc sulfate.

Flat filaments having a substantially uniform and continuous hollow interior are obtained.

By varying the amount of calcium carbonate and the aging degree hollow filaments of flat-macaroni, macaroni, flat-bamboo or bamboo-like shape are obtainable.

Example 2

In the course of the preparation of the viscose after the manner of Example 1 except that the amount of carbon disulfide is increased to 40% based on cellulose, 0.5% of finely grained calcium carbonate based on cellulose is added and suspended therein. The viscose is aged to a Hottenroth number of 9 and is extruded into the spinning bath of Example 1.

Flat-bamboo-like shaped hollow filaments are obtained.

The 0.5% of calcium carbonate may be replaced by 0.25% of sodium carbonate and 0.25% of calcium carbonate with almost the same result. In this case there occurs no difficulty in aging and filtering operation as the amount of sodium carbonate is very small.

Example 3

Finely grained calcium carbonate in an amount of 1.5% based on cellulose is suspended in a viscose analyzing carbon disulfide 33% (based on cellulose) as added, cellulose 7.8% and sodium hydroxide 6.2%, and the mixture at a Hottenroth number of 10 is extruded into a spinning bath having a temperature of 60° C. and containing 130 g./l. sulfuric acid, 300 g./l. sodium sulfate and 50 g./l. zinc sulfate.

Rosary or chaplet-like shape hollow filaments having a plurality of individual small substantially spherical voids along the length thereof are obtained.

*Example 4*

Finely grained strontium carbonate in an amount of 1% based on cellulose is suspended in a viscose analyzing carbon disulfide 35% (based on cellulose) as added, cellulose 7.0% and sodium hydroxide 6.0%, and aged to a Hottenroth number of 8. The mixture is extruded into a spinning bath having a temperature of from 45 to 60° C. and containing 110 g./l. sulfuric acid, 200 g./l. sodium sulfate and 20 g./l. zinc sulfate.

Flat-bamboo-like shaped hollow filaments are obtained.

*Example 5*

Finely grained barium carbonate in an amount of 1% based on cellulose is suspended in a viscose analyzing carbon disulfide 42% (based on cellulose) as added, cellulose 7.8% and sodium hydroxide 5.6%, and aged to Hottenroth number of 19.8. The mixture is extruded in the spinning bath of Example 1.

Flat-macaroni-like shaped hollow filaments are obtained.

I claim:

1. A process for the manufacture of hollow filaments of regenerated cellulose which comprises spinning viscose having a Hottenroth number not less than 8, analyzing from 33 to 45% carbon disulfide based on cellulose, from 5 to 9% sodium hydroxide based on viscose and from 6 to 9% cellulose and containing added substance of from 0.1 to 3% based on viscose selected from the group consisting of calcium carbonate, strontium carbonate, barium carbonate and mixtures of said carbonates in the form of fine particles, in a spinning bath having a temperature between 40 to 70° C. and containing 90–180 g./l. of sulphuric acid, 200–350 g./l. of sodium sulfate and 5–80 g./l. of zinc sulfate.

2. A process according to claim 1, wherein said added substance is from 0.2 to 0.5% based on viscose and the spinning bath has a temperature between 45 to 65° C.

3. A process for the manufacture of hollow filaments of regenerated cellulose which comprises spinning viscose having a Hottenroth number not less than 8, analyzing from 33 to 45% carbon disulfide based on cellulose, from 5 to 9% sodium hydroxide based on viscose and from 6 to 9% cellulose and containing a finely divided substance of from 0.1 to 3% based on viscose selected from the group consisting of calcium carbonate, strontium carbonate, barium carbonate and mixtures of said carbonates added to the viscose in course of preparation thereof, in a spinning bath having a temperature between 40 to 70° C. and containing 90–180 g./l. of sulfuric acid, 200–350 g./l. of sodium sulfate and 5–80 g./l. of zinc sulfate.

4. A process according to claim 3, wherein the amount of the finely divided substance is from 0.2 to 0.5% based on viscose and the spinning bath has a temperature between 45 to 65° C.

References Cited in the file of this patent

UNITED STATES PATENTS

| | | |
|---|---|---|
| 2,476,293 | Hall et al. | July 19, 1949 |

FOREIGN PATENTS

| | | |
|---|---|---|
| 253,477 | Great Britain | May 19, 1927 |
| 253,954 | Great Britain | July 1, 1926 |
| 282,687 | Great Britain | Apr. 22, 1929 |